United States Patent
Albert et al.

(10) Patent No.: US 10,158,149 B2
(45) Date of Patent: Dec. 18, 2018

(54) METHOD AND APPARATUS TO DETECT AND MANAGE BATTERY PACK CELL SWELL

(71) Applicant: MOTOROLA SOLUTIONS, INC., Schaumburg, IL (US)

(72) Inventors: Warren B. Albert, Watkinsville, GA (US); Amy T. Herrmann, Suwanee, GA (US); John E. Herrmann, Suwanee, GA (US); William B. Kiger, Hoschton, GA (US); Edmond Louie, Snellville, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 892 days.

(21) Appl. No.: 14/548,318

(22) Filed: Nov. 20, 2014

(65) Prior Publication Data
US 2016/0149270 A1   May 26, 2016

(51) Int. Cl.
*H01M 10/44* (2006.01)
*H01M 10/42* (2006.01)
*H01M 10/48* (2006.01)
H01M 10/0525 (2010.01)

(52) U.S. Cl.
CPC ... *H01M 10/4257* (2013.01); *H01M 10/4207* (2013.01); *H01M 10/441* (2013.01); *H01M 10/446* (2013.01); *H01M 10/448* (2013.01); *H01M 10/482* (2013.01); *H01M 10/488* (2013.01); *H01M 10/0525* (2013.01); *H01M 10/4285* (2013.01); *H01M 10/445* (2013.01); *H01M 2200/00* (2013.01); *H01M 2200/20* (2013.01)

(58) Field of Classification Search
CPC ................. H01M 10/445; H01M 2200/20
See application file for complete search history.

(56) References Cited

U.S. PATENT DOCUMENTS

| | | | |
|---|---|---|---|
| 6,175,213 B1 | 1/2001 | Centa et al. | |
| 7,826,189 B1 | 11/2010 | Edwards | |
| 8,691,408 B2 | 4/2014 | Hong et al. | |
| 8,717,186 B2 | 5/2014 | Zhou | |
| 2004/0247994 A1* | 12/2004 | Masuda | H01M 2/345 429/66 |
| 2005/0029990 A1* | 2/2005 | Tsukamoto | H01M 10/44 320/135 |
| 2006/0076926 A1 | 4/2006 | Lee | |
| 2011/0024275 A1* | 2/2011 | Aisenbrey | B29C 45/0013 200/262 |
| 2012/0133521 A1 | 5/2012 | Rothkopf et al. | |
| 2012/0208054 A1 | 8/2012 | Shirawawa et al. | |

(Continued)

FOREIGN PATENT DOCUMENTS

EP   2672548 A1   12/2013

*Primary Examiner* — Jeremiah R Smith
(74) *Attorney, Agent, or Firm* — Barbara R. Doutre; Lawrence A. Baratta, Jr.

(57) ABSTRACT

A method and apparatus for detecting and responding to cell swell in one or more cells of a battery includes receiving one or more indications of cell swell from switching circuitry associated with a cell, determining if the battery is fit for purpose based on the one or more indications, and performing an action responsive to the one or more indications and whether the battery is fit for purpose.

31 Claims, 7 Drawing Sheets

(56) References Cited

U.S. PATENT DOCUMENTS

| | | | |
|---|---|---|---|
| 2013/0323554 A1* | 12/2013 | Heubner | H01M 10/48 429/91 |
| 2014/0042961 A1 | 2/2014 | Lan | |
| 2015/0380778 A1* | 12/2015 | Kim | H01M 2/1016 429/61 |
| 2016/0064780 A1* | 3/2016 | Jarvis | H01M 10/4257 429/50 |
| 2016/0268644 A1* | 9/2016 | Lee | H01M 10/48 |

* cited by examiner

METHOD AND APPARATUS TO DETECT AND MANAGE BATTERY PACK CELL SWELL

BACKGROUND OF THE INVENTION

In batteries, as lithium-ion cells continue to increase in energy density, there is a corresponding increase in the total release of energy and temperature of the material released during catastrophic failure. The likelihood of cascaded, catastrophic cell failures in multi-cell packs when a single cell experiences catastrophic failure also increases. That is, as lithium-ion batteries become higher and higher in energy density, the likelihood of cell swell also increases. Cell swell, which can be referred to as battery bloating or swollen batteries, occurs in lithium-ion cells, and the cell swell includes the lithium-ion cells physically bulging, typically from a midsection of the cells. All battery packs, with lithium-ion cells, are designed with space to accommodate the normal end of life cell swell. Exposure to extreme conditions (e.g., high temperatures, abusive conditions, extended cycle life, inappropriate charge termination) may result in severe cell swell. Users perceive swollen cell packs as potential safety issues. Also, the swollen cells can also cause permanent product damage. Packing more cells and higher energy cells into products requires better techniques to take batteries out of service before users take them to a critical cell swell point which can result in perceived safety concern (bulging) and possible product damage (e.g. cracked displays, housings, etc.).

Accordingly, there is a need for a method and apparatus to detect and manage battery pack cell swell.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a method is provided for detecting and responding to cell swell in one or more cells of a battery. The method includes receiving one or more indications of cell swell from switching circuitry associated with a cell, determining if the battery is fit for purpose based on the one or more indications, and performing an action responsive to the one or more indications and whether the battery is fit for purpose.

In another exemplary embodiment, a battery pack is described that is configured to detect and respond to cell swell in one or more cells. The battery pack includes one or more cells each with one or more switching circuitry disposed thereon to detect cell swell; logic circuitry coupled to the one or more switching circuitry; and a housing for the one or more cells and the logic circuitry; wherein the logic circuitry is configured to: receive one or more indications of cell swell from switching circuitry of the one or more switching circuitry; determine if the battery pack is fit for purpose based on the one or more indications; and cause an action to be performed responsive to the one or more indications and whether the battery pack is fit for purpose.

In a further exemplary embodiment, a circuit associated with a cell in a battery is configured to detect and respond to cell swell in the cell. The circuit includes switching circuitry associated with the cell and is configured to detect the cell swell based on whether the switching circuitry is on or off; and logic circuitry coupled to the switching circuitry and configured to receive indications of cell swell from the switching circuitry; determine if the battery is fit for purpose based on the indications; and cause an action to be performed responsive to the indications and whether the battery is fit for purpose.

In various exemplary embodiments, a method and apparatus detect cell swell in a battery pack, notify an end user, and/or isolate/disable the cell/battery pack before the cell(s) grow large enough to cause catastrophic cell damage, severe product bulging and/or permanent product damage. In an exemplary embodiment, a cell pack is constructed with conductive members on an insulative substrate with logic circuitry to determine critical cell growth prior to and before catastrophic cell damage or product damage. In another exemplary embodiment, a cell pack is constructed with a dome switch or similar device located between cells of a multi-cell stack connected to a logic circuit which can be used to notify or warn the end user to take the battery out of service or disable the ability to charge and discharge the cell(s). In a further exemplary embodiment, a cell pack is constructed a membrane switch (e.g. similar to a keypad switch) located on the cell which activates with cell swell and triggers logic circuit to notify or warn and end user to take the battery out of service or the circuit can disable the ability to charge and discharge the cell(s).

For the purposes of this application, the logic circuitry can be implemented using well known/readily available components/approaches/techniques and thus will not be described.

Figure 1:
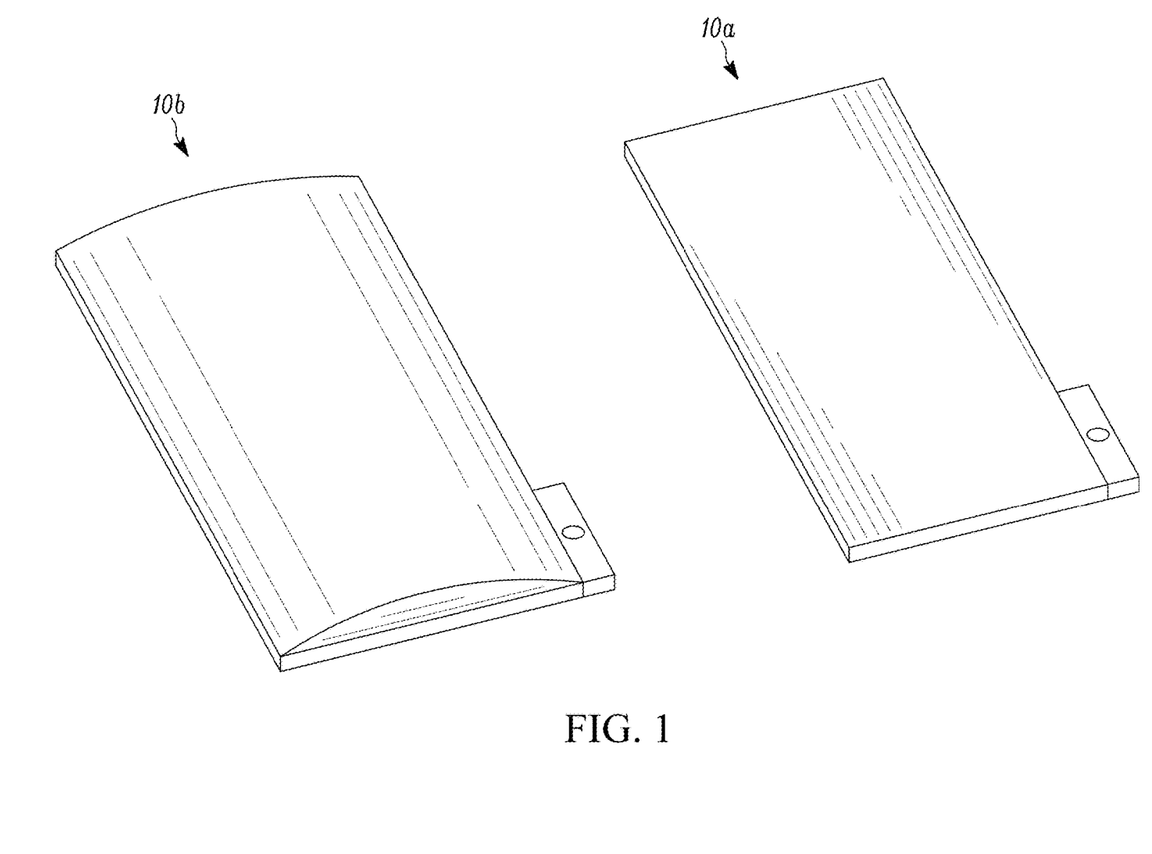
FIG. 1 is a perspective diagram of a normal lithium-ion cell pack and a swollen lithium-ion cell pack.

FIG. 1 is a perspective diagram of a normal lithium-ion cell pack 10a and a swollen lithium-ion cell pack 10b. The lithium-ion cell pack 10b is shown with extreme swelling as it experiences a catastrophic failure. Again, as lithium-ion cells continue to increase in energy density, there is a corresponding increase in the total release of energy and temperature of the material released during catastrophic failures. The likelihood of cascaded, catastrophic cell failures in multi-cell packs when a single cell experiences catastrophic failure also increases. As can be seen in FIG. 1, the lithium-ion cell pack 10b is likely to cause damage to a product if it is engaged when the catastrophic failure occurs. Note, the damage in the lithium-ion cell pack 10b includes swelling in a mid-portion of the lithium-ion cell pack 10b. If the lithium-ion cell pack 10b is flat, i.e. a stack of cells or a multi-cell stack, the swelling will be pancaking of the mid-portion of the flat layer. If the lithium-ion cell pack 10b is cylindrical, the swelling will be bulging in the mid-portion of the cylinder.

Figure 2:
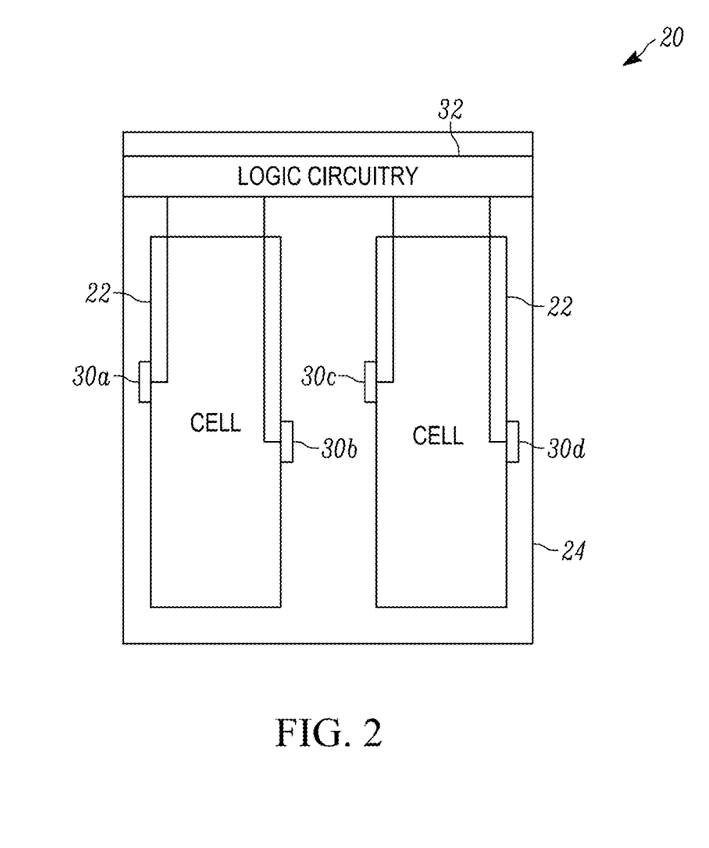
FIG. 2 is a block diagram of battery pack configured to detect cell swell in cells in accordance with some embodiments.

FIG. 2 is a block diagram of battery pack 20 configured to detect cell swell in cells 22. The cells 22 are contained in a housing 24. Due to chemistries of the cells 22 having a higher energy density, the battery pack 20 includes precise electrical and mechanical controls, such as precision electronics, temperature measurement, and construction mechanisms. Packing more cells and higher energy cells into products require better techniques to take batteries out of service before users take them to critical cell swell point which can result in perceived safety issues (bulging) and possible product damage (e.g. cracked displays). Thus, each of the cells 22 includes switching circuitry 30 (labeled in FIG. 2 as switching circuitry 30a, 30b, 30c, 30d) coupled to logic circuitry 32 that are configured to detect cell swell prior to a critical swell point. The logic circuitry 32 is configured to notify/warn an end user subsequent to detecting the cell swell and/or to isolate/disable the cell 22 and/or the battery pack 20 before the cell(s) 22 grow large enough to cause catastrophic cell damage, severe product bulging and/or permanent product damage (i.e., damage to the battery pack 20, a host device, or both).

Various exemplary embodiments of the switching circuitry 30 are illustrated in FIGS. 4-8. In general, the switching circuitry 30 is configured to use electro-mechanical techniques to detect a certain swell point of each of the cells 22 relative to another object in the housing 24. That is, the switching circuitry 30 is configured to turn on for a particular cell 22 after that cell 22 has swelled to a certain point relative to an adjacent object, e.g. another cell 22, the housing 24, or the like. Each of the cells 22 can include one or more of the switching circuitry 30, and each switching circuitry 30 is coupled to the logic circuitry 32 to provide an indication that it has detected the cell swell. Thus, the battery pack 20 can detect cell swell on an individual cell 22 basis.

Again, as described in FIG. 1, the switching circuitry 30 is preferably placed at the mid-portions of the cells 22 based on how the cell swell affects lithium-ion batteries. That is, given that a swelling cell has curvature, an implementation of the switching circuitry 30 may include tightly spaced traces or an annular ring implementation. Material for the switching circuitry 30 can be thin aluminum or the like that would flatten when it interfaces with another cell or housing.

Note, if there is a single cell 22 in the housing 24, the switching circuitry 30 is configured to detect cell swell based on engagement between the cell 22 and the housing 24 detected by the switching circuitry 30. If there are multiple cells 22 in the housing, such as shown in FIG. 2, end cells 22 can detect swell based on engagement between the cell 22 and the housing 24 detected by the switching circuitry 30 (e.g., the switching circuitry 30a, 30s), and interior cells 22 can detect swell based on engagement between the cell 22 and adjacent cells 22 detected by the switching circuitry 30 (e.g., the switching circuitry 30b, 30c).

The switching circuitry 30 is positioned at or near locations in the cells 22 that are affected by the cell swell and detect enlargement of the cells 22 to notify the logic circuitry 32. The switching circuitry 30 contemplates use in any shape for the cells 22, and positioning according to the likely locations for swelling. Again, each of the cells 22 can include more than one of the switching circuitry 30. For illustration purposes, the battery pack 20 in FIG. 2 is shown with the two cells 22 contained in the housing 24. Those of ordinary skill in the art will recognize other embodiments are also contemplated such as a single cell 22 in the housing 24 or more than two cells 22 in the housing 24.

Figure 3:
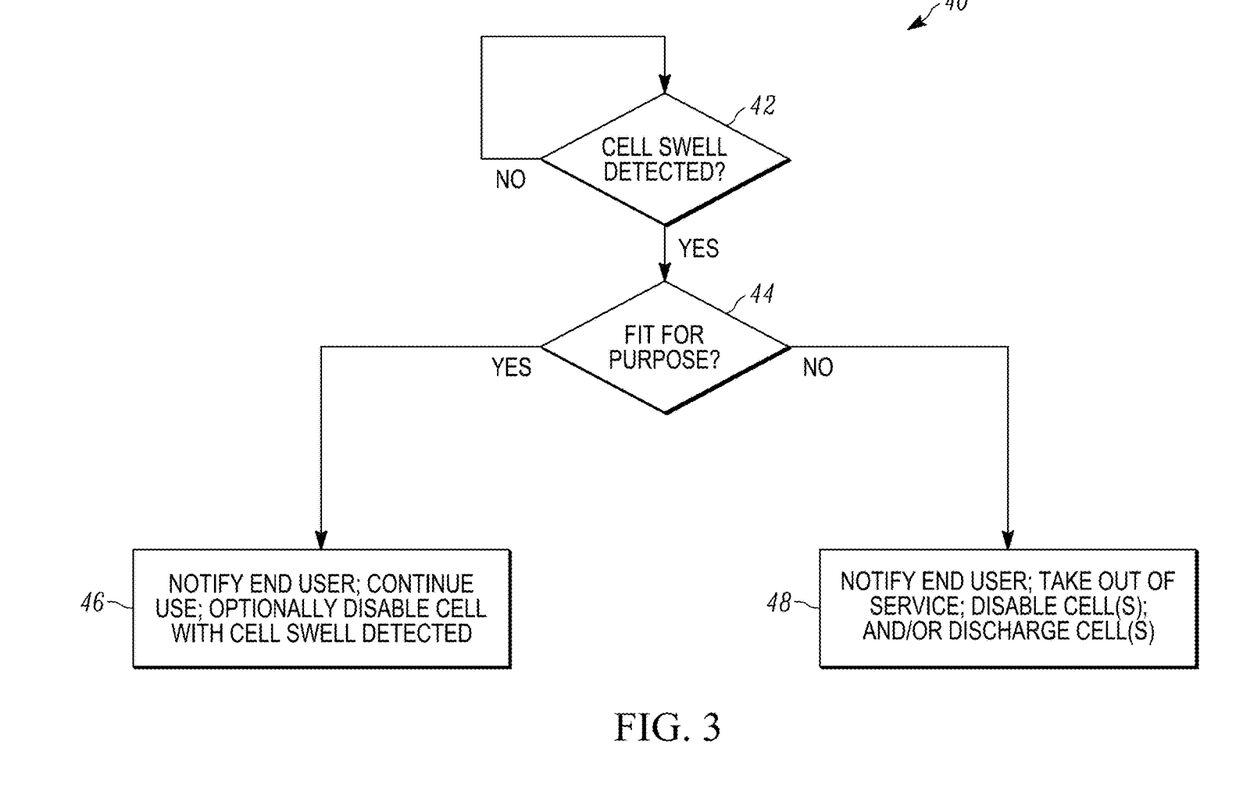
FIG. 3 is a flowchart of a logic circuitry process implemented in the battery pack in accordance with some embodiments.

FIG. 3 is a flowchart of a logic circuitry process 40 implemented in the battery pack 20. The logic circuitry process 40 contemplates operation in the logic circuitry 32 based on input from the switching circuitry 30. The logic circuitry process 40 initiates upon one of the switching circuitry 30 detecting cell swell (step 42). That is, the logic circuitry process 40 initiates upon receiving an indication from one or more of the switching circuitry 30 that the cell swell is detected. The logic circuitry process 40 determines whether or not, subsequent to detecting the cell swell, if the battery pack is fit for purpose (step 44). This step determines whether or not the battery pack 20 is capable of continued use. For example, if there are multiple cells 22, and the cell swell is detected on only one of the cells 22, the battery pack 20 may still be fit for purpose. Here, the end user is notified, and the battery pack 20 is continued to be used. Optionally, the logic circuitry process 40 can disable the cell 22 with the cell swell detected, while leaving the other cells 22 active. The logic circuitry process 40 contemplates using protection circuitry in the battery pack 20 to selectively disable charging and discharging in any of the cells 22. One objective of the logic circuitry process 40 is to not disable the battery packs 20 unless necessary.

If the logic circuitry process 40 determines the battery pack 20 is not fit for purpose (step 44), the end user is notified and one or more actions are taken (step 48). The one or more actions can include taking the battery pack out of service, disabling one or more of the cells 22 using the protection circuitry, and/or discharging one or more of the cells 22 to render the battery pack substantially inert. In both of the steps 46, 48, the end user can be notified through any technique such as an audible or visual alert associated with the battery pack 20, communications between the battery pack 20 and the host device or a charging device, and the like.

The switching circuitry 30 and the logic circuitry process 40 implement a pass/fail approach to detecting and responding to cell swell. The switching circuitry 30 is more effective and less complex than other approaches that measure battery swelling where a continuous response (such as strain, capacitance or resistance change) is measured rather than a pass/fail metric of detecting the shorting of the outer cell surfaces by the switching circuitry 30. By pass/fail, the switching circuitry 30 is either on or off and the cell swell is detected or indicated based thereon, e.g. when the switching circuitry 30 goes from off to on, cell swell may be detected.

Of note, other techniques exist that give variable data associated with the battery pack 20 that can show the degradation of the cells 22 rather than the pass/fail of the switching circuitry 30 and the logic circuitry process 40. However, the cost and difficulty of implementation, in a mass production environment, makes the use of strain gauge type systems (e.g. resistive elements) prohibitive. The pass/fail type criteria described herein allows easier transferability from one battery platform to another, whereas variable data, in the other techniques, would take extensive designs and experiments to interpret what values mean for each design implementation and what to do as a result.

Note, when there are multiple of the switching circuitry 30 on each of the cells 22, the pass/fail approach has degrees. For example, if there are two of the switching circuitry 30 on a cell 22, and only one of the switching circuitry 30 detects swell, then it can be said the cell 22 has detected a portion of cell swell. If there are more than two of the switching circuitry 30, the degrees or granularity is further refined. Thus, from a fit for purpose perspective, it may not be necessary to remove a cell 22 or battery pack 20 at the first instance of detection, but only after a certain point, such as when a plurality of the switching circuitry 30 has detected the cell swell.

From an application perspective, the battery pack 20 contemplates use in any application such as a mobile device (e.g., two-way radios, smart phones, etc.), electric vehicles, and the like. Also, the battery pack 20 can be either fixed in a host device or selectively removable. The objective of the switching circuitry 30 and the logic circuitry process 40 is to effectively manage battery life cycle in the field and to detect and alert the end user of cell swell prior to the seal of an intrinsically safe battery seal getting compromised or safety components getting damaged, and safely shut down the battery pack 20 or take it out of service based thereon.

With respect to portable radios, portable radio battery packs tend to use many cells and many cells in parallel (e.g., up to 6 cells in parallel in series with 6 cells in parallel). Laptops tend to be thin and as a result tent to place cells end-to-end or side-by-side in manner where only one cell thickness contributes to the thickness of the product. Tablets and smart phones, in general, put a premium on thickness so these devices almost exclusively configure the cells in the device such that only one cell thickness contributes to the thickness of the product. Thus, the method and apparatus have specific application to portable radios, laptops, tablets, etc. where multiple cells are used.

FIGS. 4-8 are block diagrams of various exemplary implementations of the switching circuitry 30. Each of FIGS. 4-8 illustrate a multi-cell stack 50 where a first cell 22a is on top of a second cell 22b with adhesive/spacing material 52 disposed therebetween. The multi-cell stack 50 is shown for illustration purposes and the various implementations of the switching circuitry 30 also contemplate use in other battery pack architectures such as cylinder shapes and the like, as well as battery packs 20 with single cells 22 and the housing 24.

Figure 4:
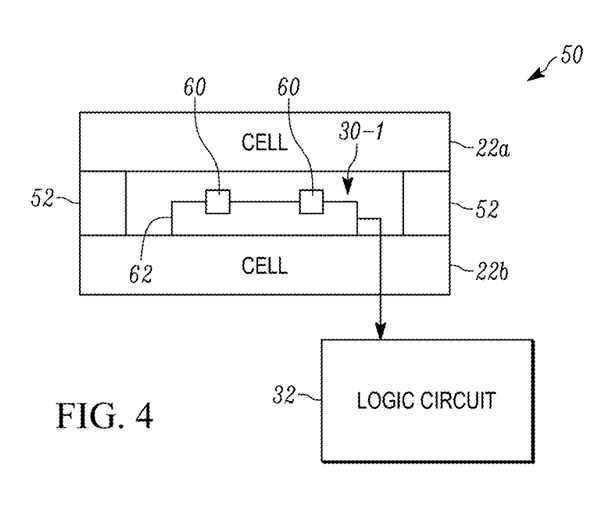
FIG. 4 is a block diagram of switching circuitry utilizing conductive traces on an insulative material in accordance with some embodiments.

FIG. 4 is a block diagram of switching circuitry 30-1 utilizing conductive traces 60 on an insulative material 62. FIG. 4 illustrates the switching circuitry 30-1 at a mid-portion of the cell 22b which is substantially flat. The switching circuitry 30-1 is coupled to the logic circuitry 32, and upon swelling by either the cell 22a or the cell 22b, the conductive traces 60 cause an indicator signal to be sent to the logic circuit 32 indicating swell on either of the cells 22a, 22b. Here, the casing of the cell 22a physically forms a circuit connecting the conductive traces 60 together to detect either or both of the cells 22a, 22b have swollen. That is, casing of the cells 22a, 22b is conductive. For example, if the casing is aluminum the casing is positive, and when the casing is steel, the casing is negative.

A single implementation of the switching circuitry 30-1 cannot determine exactly which of the cells 22a, 22b is swollen, but the logic circuitry 32 can be coupled to multiple implementations of the conductive traces 60 at different locations, and correlate received signals to determine exactly which of the cells 22a, 22b is swollen.

Figure 5:
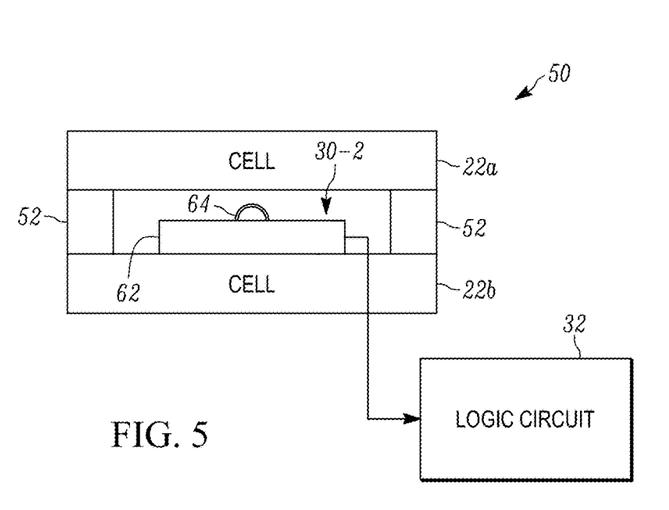
FIG. 5 is a block diagram of switching circuitry utilizing a dome or membrane switch on an insulative material in accordance with some embodiments.

FIG. 5 is a block diagram of switching circuitry 30-2 utilizing a dome or membrane switch 64 on an insulative material 62. The switching circuitry 30-2 operates similarly as the switching circuitry 30-1, with the dome or membrane switch 64 providing the pass/fail mechanism instead of the conductive traces 60. The dome or membrane switch 64 has a small, flexible metal dome that is located over the complementary conductive surfaces on an underlying substrate. The flexing of the dome results in the dome establishing an electrical connection between the conductive surfaces on the substrate.

Figure 6:
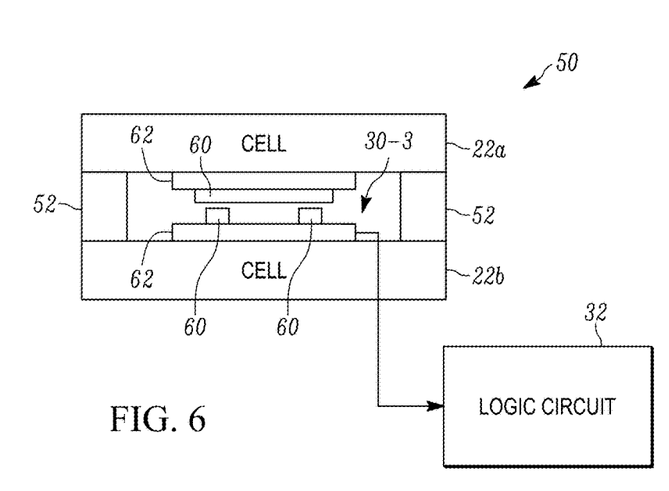
FIG. 6 is a block diagram of switching circuitry utilizing conductive traces on an insulative material on both of the cells in accordance with some embodiments.

FIG. 6 is a block diagram of switching circuitry 30-3 utilizing conductive traces 60 on an insulative material 62 on both of the cells 22a, 22b. The switching circuitry 30-3 operates similarly as the switching circuitry 30-1. In particular, the switching circuitry 30-3 uses the same conductive traces 60 as in the switching circuitry 30-1, on the cell 22b, but also includes the insulative material 62 and the conductive traces 60 on the cell 22a. Here, the conductive traces 60 on the cell 22a close the conductive traces 60 on the cell 22b responsive to cell swell on either of the cells 22a, 22b. This approach is better suited than the switching circuitry 30-1 when there is insulation between the cells 22a, 22b, making it difficult for the cell 22a to close the conductive traces 60 on the cell 22b in the switching circuitry 30-1.

Figure 7:
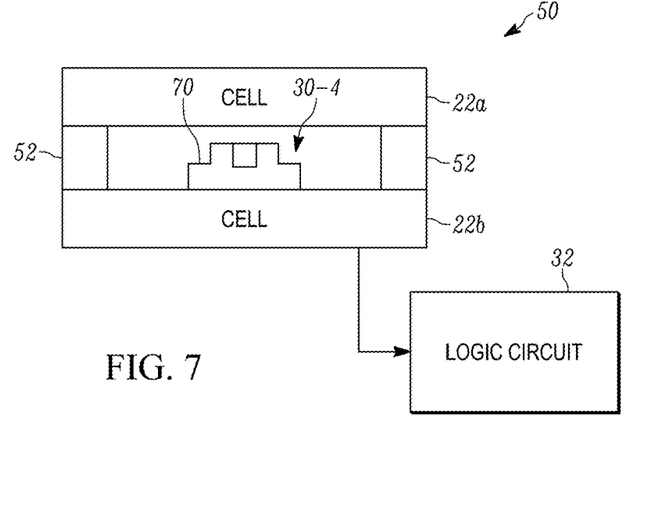
FIG. 7 is a block diagram of switching circuitry utilizing a carbon keypad in accordance with some embodiments.

FIG. 7 is a block diagram of switching circuitry 30-4 utilizing a carbon keypad 70. The switching circuitry 30-4 operates similarly as the switching circuitry 30-2. The carbon keypad 70 makes an electronic switch when a carbon piece on a base of the switch contacts complementary conductive surfaces on an underlying substrate. The switching circuitry 30-4 is more effective than the switching circuitry 30-2 when there is insulation between the cells 22a, 22b.

Figure 8:
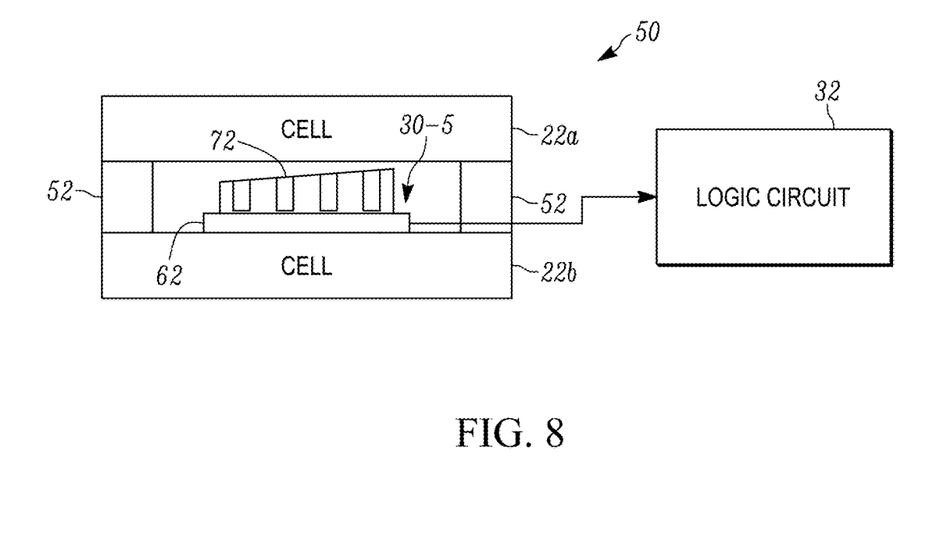
FIG. 8 is a block diagram of switching circuitry utilizing alternating conductors/insulators for graduated measurement in accordance with some embodiments.

FIG. 8 is a block diagram of switching circuitry 30-5 utilizing alternating conductors/insulators 72 for graduated measurement. The switching circuitry 30-5 can operate similarly as the switching circuitry 30-1, 30-3. Here, there are different conductive traces in the conductors/insulators 72 so that a degree or amount of cell swell can be detected. For example, in FIG. 8, there are four conductors illustrated. If the two inner conductors make a connection, this shows less swell than if the two outer conductors make a connection. Thus, from the switching circuitry 30-5, a graduated measurement can be derived in furtherance of a pass/fail measurement.

The battery pack 20 contemplates using any of the switching circuitry 30-1, 30-2, 30-3, 30-4, 30-5. Note the cells 22 can include one or more of the switching circuitry 30, placed at appropriate locations to detect (pass/fail) cell swelling. The method and apparatus contemplates both pass/fail detection as well as graduated measurements—using the switching circuitry 30-5. First, the switching circuitry 30 is pass/fail—either indicative of cell swell or not. Second, the graduated measurements can include having multiple of the switching circuitry 30 per cell 22 as well as using the switching circuitry 30-5 which includes built-in graduated measurements for a graduated manner of detection.

Figure 9:
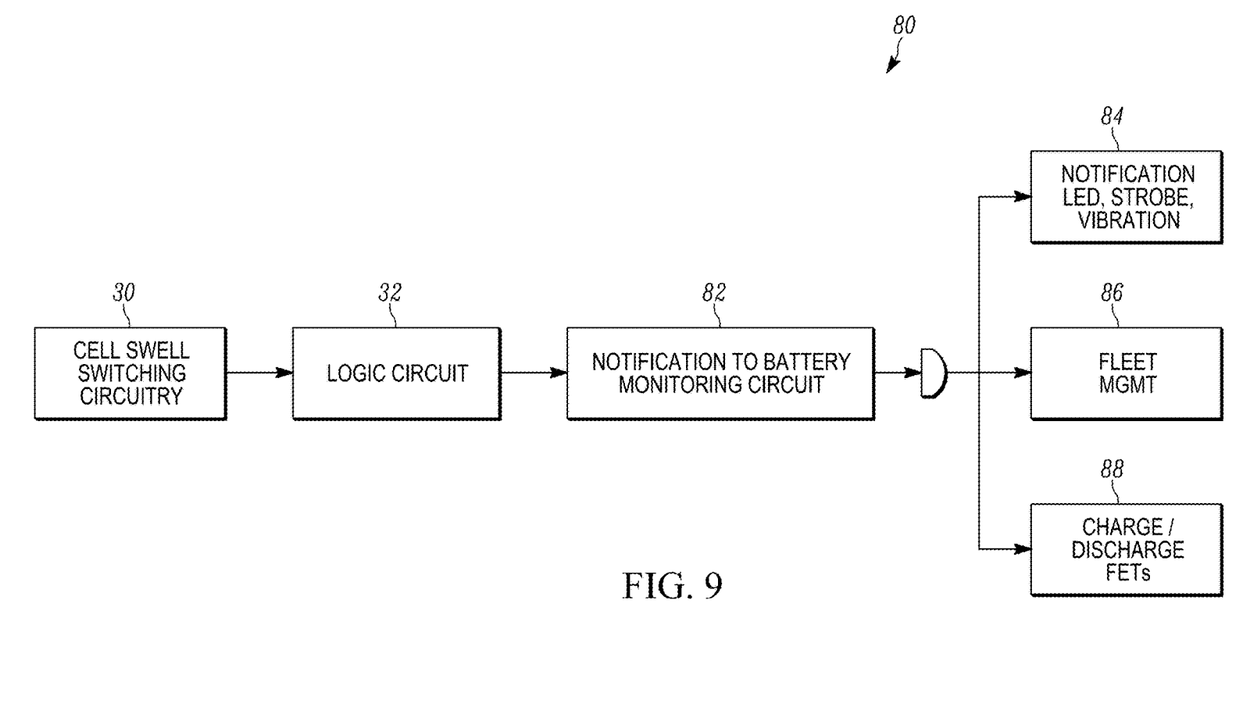
FIG. 9 is a block diagram of a cell swell detection system in accordance with some embodiments.

FIG. 9 is a block diagram of a cell swell detection system 80. Again, the cell swell detection system 80 includes the switching circuitry 30 (cell swell switching circuitry) and the logic circuitry 32. The logic circuitry 32 is coupled to a notification to battery monitoring circuit 82. The battery monitoring circuit 82 is configured to, responsive to detection of cell swell by the logic circuitry 32, perform various functions such as a notification 84, an alert to fleet management 86, and proactive measures 88. The notification 84 can include, without limitation, displaying a Light Emitting Diode (LED) of different or varying colors, strobe light, color changing material or indicators, or the like, vibrating, playing an audible sound, etc.

The alert to fleet management 86 can be through the host device of the battery pack 20 or a charging station for the battery pack 20. Here, the fleet management 86 is alerted to remove the battery pack 20 from operation. The proactive measures 88 include preventing charge/discharge Field-Effect Transistors (FETs) to physically disable the cells 22 or the battery pack 20 from charging, discharging, and the like. The cell swell detection system 80 is configured to notify/warn as well as perform graduated effects, so the battery pack 20 can have a maximum usage without damage to the host product. The graduated effects can include taking only affected cells 22 out of service, preventing/inhibiting charging but allowing discharging, and preventing/inhibiting both charging and discharging.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for detecting and responding to cell swell in one or more of a plurality of cells of a battery pack, the method comprising:

receiving one or more indications of cell swell from switching circuitry disposed on each cell outer surface between adjacent cells to detect cell swell on a cell by cell basis, wherein the switching circuitry is formed of tightly spaced traces disposed on each cell that flatten when interfaced with an adjacent cell or host housing in response to the cell swell, the tightly spaced traces being formed of alternating conductors and insulators to provide for a graduated measurement of cell swell;

determining if the battery pack is fit for purpose based on the graduated measurement of cell swell for each cell;

continuing to operate the battery pack when the graduated measurement of cell swell indicates that the battery pack is fit for purpose; and performing an action to take the battery pack out of service when the graduated measurement of cell swell indicates that the battery pack is not fit for purpose.

2. The method of claim 1, wherein the cell is a lithium-ion cell, and the cell swell is due to end of life and/or exposure to extreme conditions.

3. The method of claim 1, wherein the action comprises one of-a notification or warning, inhibiting charging of the cell and allowing discharging of the cell, and inhibiting charging and discharging of the cell, the action being based on a graduated measurement of the cell swell.

4. The method of claim 1, wherein the action comprises a notification through any of displaying a Light Emitting Diode (LED), lighting a strobe light, displaying a color changing material or indicators, vibrating, playing an audible sound, and communicating to a host device or a charging station.

5. The method of claim 4, wherein the host device is a portable radio.

6. The method of claim 1, wherein the action comprises disabling the cell, using protection circuitry associated with the cell, and/or discharging the cell to render the cell substantially inert.

7. The method of claim 1, wherein the switching circuitry is placed at mid-portions of the cells.

8. The method of claim 1, wherein the battery pack comprises end cells and interior cells within a housing, and cell swell of the end cells is detected by the switching circuitry based on engagement between each end cell and the housing, and cell swell of the interior cells is detected by the switching circuitry based on engagement between adjacent cells of the interior cells.

9. The method of claim 1, wherein the switching circuitry comprises different conductive traces disposed on an insulative material on each cell for detecting an amount of cell swell.

10. The method of claim 1, wherein a casing of each cell physically forms a circuit with an adjacent cell connecting of the plurality of traces together in response to cell swell.

11. The method of claim 1, wherein the switching circuitry provides both pass/fail detection as well as graduated measurements of cell swell.

12. The method of claim 1, wherein the graduated measurement of cell swell for each cell provides degrees of granularity used to determine which cells of the plurality of cells remain in operation.

13. A battery pack configured to detect and respond to cell swell in one or more cells of a plurality of cells in the battery pack, the battery pack comprising:

a plurality of cells each with switching circuitry disposed on each cell outer surface between adjacent cells to detect cell swell on a cell by cell basis, wherein the switching circuitry is formed of tightly spaced traces disposed on each cell that flatten when interfaced with an adjacent cell or host housing in response to the cell swell, the tightly spaced traces being formed of alternating conductors and insulators to provide for a graduated measurement of cell swell;

logic circuitry coupled to the switching circuitry; and a housing for the plurality of cells and the logic circuitry;

wherein the logic circuitry is configured to:

receive the graduated measurement of cell swell from the switching circuitry;

determine if the battery pack is fit for purpose based on the graduated measurement of cell swell;

continue to operate the battery pack when the graduated measurement of cell swell indicates that the battery pack is fit for purpose; and cause an action to be performed to take the battery pack out of service when the graduated measurement of cell swell indicates that the battery pack is not fit for purpose.

14. The battery pack of claim 13, wherein the plurality of cells are a lithium-ion cell, and the cell swell is due to end of life and/or exposure to extreme conditions.

15. The battery pack of claim 13, wherein the action comprises one of-a notification or warning, inhibiting charging of the one or more cells and allowing discharging of the one or more cells, and inhibiting charging and discharging of the cell, the action being based on a graduated measurement of the cell swell.

16. The battery pack of claim 13, wherein the action comprises a notification through any of displaying a Light Emitting Diode (LED), lighting a strobe light, displaying a color changing material or indicators, vibrating, playing an audible sound, and communicating to a host device or a charging station.

17. The battery pack of claim 13, wherein the action comprises disabling one or more cells of the plurality of cells, using protection circuitry associated with the one or more cells of the plurality of cells, and/or discharging one or more cells of the plurality of cells to render the one or more cells substantially inert.

18. The battery pack of claim 13, wherein the switching circuitry is one of: conductive traces disposed on an insulative material on the outer surface of each of the plurality of cells, wherein the cell swell causes the conductive traces to close to provide an indication of the cell swell; and a dome or membrane switch or a carbon keypad on the outer surface of each of the plurality of cells configured to provide an indication of the cell swell.

19. The battery pack of claim 13, wherein the switching circuitry is placed at mid-portions of the cells.

20. The battery pack of claim 13, wherein the battery pack comprises end cells and interior cells within a housing, and cell swell of the end cells is detected by the switching circuitry based on engagement between each end cell and the housing, and cell swell of the interior cells is detected by the switching circuitry based on engagement between adjacent cells of the interior cells.

21. The battery pack of claim 13, wherein the switching circuitry comprises different conductive traces disposed on an insulative material on each cell for detecting an amount of cell swell.

22. The battery pack of claim 13, wherein a casing of each cell physically forms a circuit with an adjacent cell connecting conductive traces of the plurality of traces together in response to cell swell.

23. The battery pack of claim 13, wherein the switching circuitry provides both pass/fail detection as well as graduated measurements of cell swell.

24. The battery pack of claim 13, wherein the graduated measurement of cell swell for each cell provides degrees of granularity used to determine which cells of the plurality of cells remain in operation.

25. A circuit associated with a cell in a battery, the circuit configured to detect and respond to cell swell in the cell, the circuit comprising:
- switching circuitry disposed on each cell outer surface between adjacent cells and configured to detect the cell swell on a cell by cell basis, wherein the switching circuitry is formed of tightly spaced traces disposed on each cell that flatten when interfaced with an adjacent cell or host housing in response to the cell swell, the tightly spaced traces being formed of alternating conductors and insulators to provide for a graduated measurement of cell swell; and
- logic circuitry coupled to the switching circuitry and configured to receive indications of cell swell from the switching circuitry for each cell;
- determine if the battery is fit for purpose based on the graduated measurement of cell swell for each cell;
- operating the battery pack when the graduated measurement of cell swell indicates that the battery pack is fit for purpose; and
- performing an action to take the battery pack out of service when the graduated measurement of cell swell indicates that the battery pack is not fit for purpose.

26. The circuit of claim 25, wherein the switching circuitry is placed at mid-portions of the cells.

27. The circuit of claim 25, wherein the battery pack comprises end cells and interior cells within a housing, and cell swell of the end cells is detected by the switching circuitry based on engagement between each end cell and the housing, and cell swell of the interior cells is detected by the switching circuitry based on engagement between adjacent cells of the interior cells.

28. The circuit of claim 25, wherein the switching circuitry comprises different conductive traces disposed on an insulative material on each cell for detecting an amount of cell swell.

29. The circuit of claim 25, wherein a casing of each cell physically forms a circuit with an adjacent cell connecting conductive traces of the plurality of traces together in response to cell swell.

30. The circuit of claim 25, wherein the switching circuitry provides both pass/fail detection as well as graduated measurements of cell swell.

31. The circuit of claim 25, wherein the graduated measurement of cell swell for each cell provides degrees of granularity used to determine which cells of the plurality of cells remain in operation.

* * * * *